Aug. 29, 1950
C. W. EARP
SUPERREGENERATIVE RECEIVER FOR ELECTROMAGNETIC WAVES
Filed Sept. 7, 1945
2,520,136
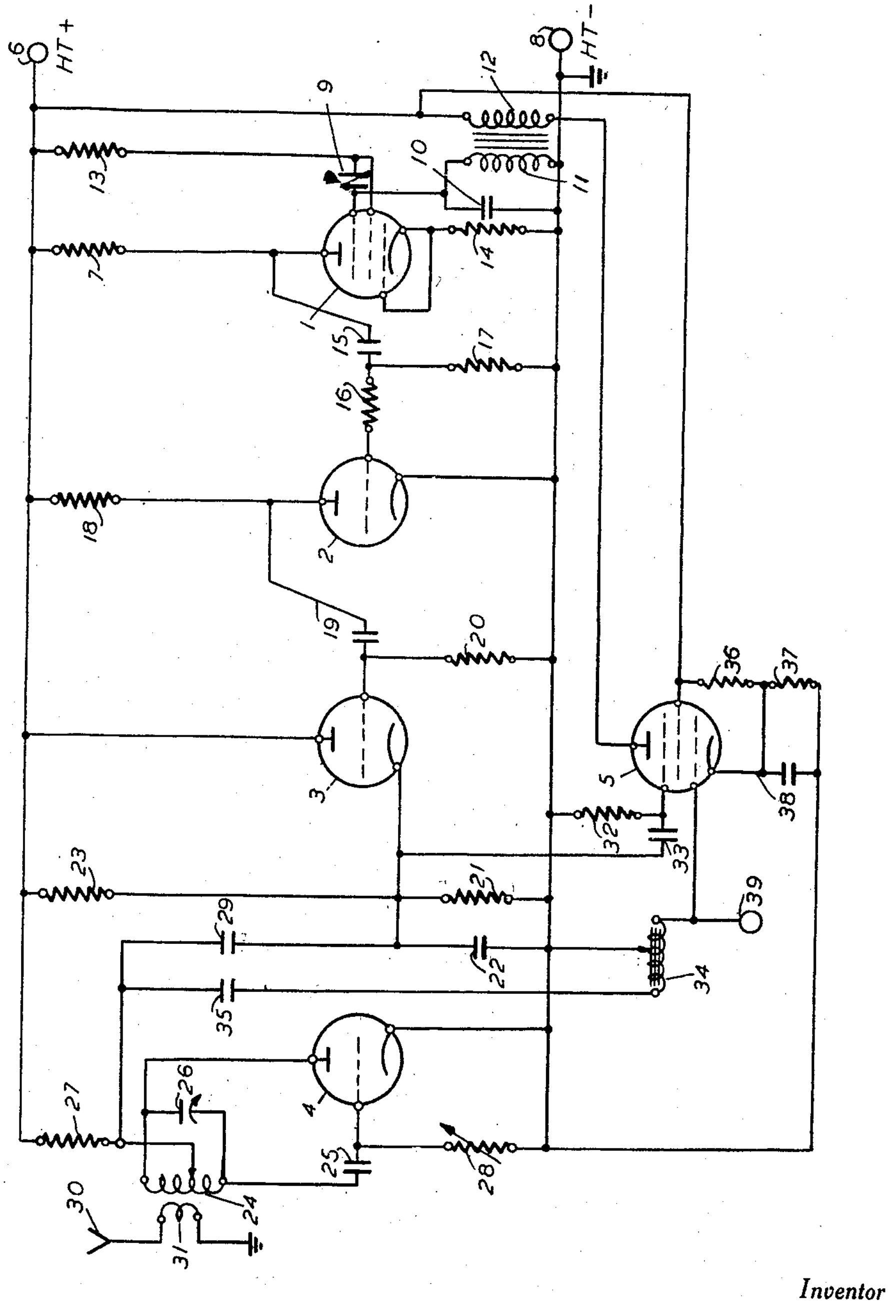
Inventor
CHARLES WILLIAM EARP
By
Attorney Patented Aug. 29, 1950

2,520,136

UNITED STATES PATENT OFFICE 2,520,136

SUPERREGENERATIVE RECEIVER FOR ELECTROMAGNETIC WAVES

Charles William Earp, London, England, assignor, by mesne assignments, to International Standard Electric Corporation, New York, N. Y., a corporation of Delaware Application September 7, 1945, Serial No. 614,954
In Great Britain September 15, 1944

9 Claims. (Cl. 250—20)

The present invention relates to super-regenerative receivers for electromagnetic waves, and is concerned particularly with the application of the super-regenerative principle to the selective reception of a particular train of electric pulses.

It is well known that a self-quenched oscillator detector may be used as a particularly efficient super-regenerative receiver for signals which are repeated approximately at the quenching frequency, preferably at a slightly higher frequency. An arrangement of this kind is described in U. S. Patent No. 2,262,838 issued November 18, 1941, for Electric Signalling System to E. M. Deloraine-A. H. Reeves. The arrival of each signal initiates oscillation which builds up and is then quenched, the quenching bias being afterwards gradually removed, so that the next signal finds the oscillator sensitive again. Thus when the quenching frequency is adjusted to be equal to or slightly lower than the repetition frequency of the signals, the periods of oscillation become synchronous with the signals. Synchronism is maintained even when the incoming signals are time-phase or frequency modulated by small amounts, and a good signal-to-noise ratio is obtained.

It is the principal object of the present invention to adapt an arrangement of this type for the selective reception of a particular pulse train in the presence of other pulse trains and noise. In order to attain this object, it is necessary that after one of the desired pulses has initiated an oscillation, the receiver shall be blocked to other pulses and noise for a period substantially equal to the shortest period which can elapse between two consecutive wanted pulses, and that it shall be fully sensitised for at least a period equal to the period during which the next wanted pulse could arrive, so that this pulse can initiate oscillation even when it is of very small amplitude.

The above object is achieved according to the invention by providing a receiving arrangement for selecting a desired train of electric signal pulses from other pulses and noise comprising means for applying incoming signals to a high frequency oscillator which is normally incapable of oscillation, means for applying to the said oscillator a train of sensitising pulses of the same repetition frequency as that of the desired signal pulses in such manner as to condition the oscillator for the initiation of oscillations by each of the desired signal pulses only for the period during which any signal pulse can arrive, and means for synchronising the sensitising pulses with the signal pulses.

In the preferred arrangements for carrying out the invention, a stable low frequency oscillator is provided for generating a wave from which the suitably shaped sensitising pulses are derived. The pulses of oscillation initiated by the wanted signals are in effect rectified in the oscillation circuit itself, and short pulses coinciding with the leading edges of the signal pulses are derived from the rectified pulses and are employed to exercise an automatic frequency control on the low frequency oscillator.

An important feature is that the limits between which the frequency can be controlled are rather close, and are strictly defined so that only pulses having the desired repetition frequency can exercise control. Another feature is that the preferred form of low frequency oscillator has a stability such that the limits within which the natural uncontrolled frequency can vary lie within the above mentioned limits of possible frequency control.

The figure of the accompanying drawing shows a schematic circuit diagram of a super-regenerative pulse receiver according to the invention. It comprises five thermionic valves of which valve 1 is a low frequency generating valve, 2 is a limiter valve producing rectangular pulses from the waves generated by valve 1, 3 is a cathode follower valve which generates sensitising pulses for the self quenching super-regenerative receiving valve 4. A gating valve 5 controls the application of pulses derived from the valve 4 to synchronise the generating valve 1. The operation of the circuit will be described in detail later.

The generating valve 1 is a pentode arranged to operate as a stable transitron oscillator of the well known type. The anode is connected to the positive terminal 6 of the high tension supply source through an anode load resistance 7, the negative high tension terminal 8 being preferably grounded as shown. The suppressor grid is connected to the screen grid through a blocking condenser 9 and to earth through a parallel resonant circuit comprising a condenser 10 and one winding 11 of a transformer, preferably having an iron core, the other winding 12 of which is connected in series with the anode of the valve 5. The elements 10 and 11 determine the oscillation frequency. The screen grid is connected to terminal 6 through a resistance 13, and the cathode and control grid are directly connected together and to ground through a small resistance 14. This resistance should be such as to bias the suppressor grid slightly negatively to the cathode.

The anode of the valve 1 is coupled to the control grid of the limiter valve 2 through a blocking condenser 15 and a series resistance 16. The junction point of elements 15 and 16 is connected to ground through a grid resistance 17. The cathode of the valve 2 is directly connected to ground, and the anode is connected to terminal 6 through an anode load resistance 18.

The anode of the valve 2 is connected to the control grid of the cathode follower valve 3 through a blocking condenser 19, a shunt resistance 20 being provided. The anode of the valve 3 is directly connected to terminal 6, and the cathode is connected to ground through the load resistance 21 shunted by a condenser 22. The cathode is also connected to terminal 6 through a resistance 23 for the purpose of providing a suitable cathode bias in conjunction with the load resistance 21.

A high frequency oscillating circuit is associated with the valve 4. This circuit comprises a tapped coil 24 connected between the anode of the valve 4 and the control grid, a blocking condenser 25 being included in series with the grid, the coil 24 being shunted by an adjustable tuning condenser 26. The frequency should be adjusted to be the same as the desired signal frequency, that is, the carrier frequency on which the incoming signal pulses are modulated. The anode load resistance 27 is connected between the tap on the coil 24 and the terminal 6. The cathode of the valve 4 is connected directly to ground, and the control grid is connected to ground through an adjustable resistance 28. The cathode of the valve 3 is connected to the anode end of the resistance 27 through a condenser 29. A receiving antenna 30 is connected to a grounded coil 31 coupled to the coil 24 for the purpose of applying the incoming signal pulses to the valve 4.

The gating valve 5 is a pentode, the anode of which is connected to terminal 6 through the winding 12 of the transformer associated with the valve 1. The suppressor grid is treated as an extra control grid and is connected to ground through the grid resistance 32, and to the cathode of the valve 3 through a blocking condenser 33. The screen grid is connected directly to terminal 6, and the control grid is connected to ground through the secondary winding of a transformer 34, the primary winding of which is connected at one end to the anode end of the resistance 27 through a condenser 35, and at the other end to ground. The cathode of the valve 5 is positively biassed by its connection to the junction point of the resistances 36 and 37 connected across the high tension supply source, the usual by-pass condenser 38 shunting resistance 37 being provided. An output terminal 39 is connected to the control grid of the valve 5.

The positive loops of the waves generated by the transitron oscillator valve 1 are limited by the grid current of the valve 2 flowing in the resistance 16, while the negative loops are limited by the cutting off of the anode current of the valve 2. The substantially vertical edges of the rectangular output pulses from the valve 2 are differentiated by the condenser 19 and resistance 20 producing alternate positive and negative short pulses which are applied to the control grid of the cathode follower valve 3 which should be biassed beyond the cut off by the resistances 21 and 23. The negative short pulses therefore have no effect and can be neglected. Each positive short pulse, however, charges the condenser 22 substantially to the maximum potential of the pulse, and after its disappearance, the condenser 22 can only discharge slowly through the resistances 21 and 23 since the valve 3 is again non-conducting.

The output wave from the cathode of valve 3 is therefore a series of sensitising voltage pulses at the frequency of the oscillator 1, the leading edges of which are very steep, but the trailing edges have a relatively slow logarithmic decay, the time constant being determined by the combined value of the resistances 21 and 23 acting in parallel, and by the capacity of the condenser 22. The time constant should be of the same order as the maximum period during which any given pulse can be received on the antenna 30.

The cathode of valve 3 superimposes the sensitising pulses on the normal anode operating voltage for the valve 4 through the condenser 29, and the effect is to bring it nearly, but not quite, to the point of oscillation. The effect of the pulses is enhanced by the coupling to the control grid through the condenser 25. The sensitizing pulses might alternatively be arranged to provide momentarily the whole of the operating voltage for the valve.

After the disappearance of one of the incoming pulses, the condenser 25 is left with a charge which applies a negative bias to the control grid, and this charge leaks away relatively slowly through the adjustable resistance 28. On the occurrence of the steep leading edge of the next sensitising pulse, the valve 4 should not actually oscillate. After the peak of the sensitising pulse has passed, the anode voltage begins to fall, but the condenser 25 is discharging and the control grid voltage is at the same time rising, so that the valve can be kept almost on the point of oscillation for an appreciable portion of the period of decay of the sensitising pulse, by a suitable adjustment of the resistance 28. When the next incoming pulse arrives on the antenna 30, oscillations are suddenly started, thus producing a sharp increase in anode current, and therefore a sharp reduction in the potential of the anode end of the resistance 27.

The sudden negative change in voltage is applied to the control grid of the gating valve 5 through the condenser 35 and transformer 34, which is poled so that it applies a very short positive differential pulse to the grid. It will thus be seen that when a train of signal pulses is received on the antenna 30, a corresponding train of very short positive pulses coinciding in time with the signal pulses will be applied to the gating valve. These short pulses will be called synchronising pulses for convenience.

The valve 5 should be of the variable gain type, and should be biassed beyond the cut-off by suitable choice of the values of the resistances 36 and 37, so that no effect is produced unless pulses are simultaneously applied to the control grid and to the suppressor grid. The sensitising pulses are applied to the suppressor grid through the condenser 33 from the valve 3. The amplitude of these pulses is so chosen that the maximum anode current is produced in the gating valve only when a synchronising pulse coincides with the peak of a sensitising pulse. Thus, if a signal pulse arrives a little after the peak of the corresponding sensitising pulse, that is, during the slow decay period, the anode current of the valve 5 will be less in proportion to the delay of the signal pulse. If the signal pulse arrives before or after the sensitising pulse, there will be no anode current at all in the valve 5.

The anode current pulses in the valve 5 are applied to the circuit of the valve 1 through the transformer 12, 11 which should be closely coupled. As the leading edges of the sensitising pulses occur when the wave generated by the valve 1 is passing through zero voltage, the pulses from the gating valve 5 exert a maximum of frequency control and a minimum of amplitude control. It will be assumed that when no signal pulses are being received, the period of the oscillations generated by the valve 1 is equal to the longest period which can elapse between two consecutive signal pulses. Preferably, also, the conditions should be such that a pulse of maximum amplitude from the gating valve (which occurs when a synchronising pulse coincides with the peak of a sensitising pulse) should reduce the next oscillation period to the shortest possible period between two signal pulses. It will be understood, of course, that the variation in the period between two consecutive signal pulses may be due to time-phase modulation (if any) and/or to variation in the repetition frequency of the pulses at the transmitter; and adjustments will also be necessary on account of lack of stability of the oscillator 1 at the receiver.

If it be assumed, for example, that a signal pulse initiates oscillation of the valve 4 about half way along the trailing edge of a sensitising pulse, the next sentitising pulse will be generated at a time corresponding to the mean probable occurrence time of the next signal pulse, and a steady recurrence of signal pulses will maintain the same relation between sensitising pulses and signal pulses. If the period of the signal pulses should tend to increase, (or that of the oscillations generated by the valve 1 should tend to decrease), there will be a reduced output from the valve 5 which will retard the sensitising pulses in such manner that synchronism is maintained. The opposite tendency will clearly produce the opposite compensating effect, so that synchronism is again maintained.

It will be noted that the signal pulses will be automatically repeated from the antenna 30, since the oscillations of the valve 4 initiated by the pulses will be retransmitted from the antenna. It is clear, also, that the amplified and rectified signal pulses can be obtained from terminal 39, and moreover, only the particular pulse train desired can be received. If the signal pulses are time-phase modulated, the modulating signals can evidently be obtained by connecting a low pass filter to the anode of valve 5.

It is to be noted that while the transitron type of oscillator is preferred for the low frequency oscillator, any suitable stable oscillator circuit adaptable for frequency control by applied pulses may be used. In the case of the transitron circuit, the use of an iron cored inductance in the frequency determining unit is advantageous from the point of view of stability, because changes in the currents flowing through the windings produces slight changes in saturation which tend to correct the frequency changes due to variations in the operating voltages. Thus, for example, an increased anode voltage tends to produce a slight reduction in frequency, but the increase in oscillation amplitude which also occurs produces a slight increase in saturation of the core, which raises the frequency.

As already mentioned, the receiving device which has been described can be used as a repeater for a particular pulse train in a pulse communication system.

In a reinforced radio location system in which a fixed station radiates pulses to a co-operating moving station on an aircraft, for example, which repeats the received pulses to the fixed station, the arrangement which has been described is particularly useful. The receiver acting as a synchronous repeater employs only one antenna, but repeats with considerable reinforcement only a desired train of pulses.

In such a system it may be that a single control station may be required to locate a number of co-operating aircraft each of which can also be individually recognised. In this case the control station may radiate pulse trains of different repetition frequencies, the aircraft receivers being each tuned only to repeat a corresponding one of the pulse trains, enabling it to be definitely identified.

What is claimed is:

1. A receiving arrangement for selecting a desired train of electric signal pulses from other pulses and noise comprising means for applying incoming signals to a high frequency oscillator, means for biasing said oscillator so that it is normally incapable of oscillation despite application of said incoming signals, an oscillator circuit supplying waves of the same repetition frequency as that of the desired signal pulses, means for deriving a train of sensitising pulses from said waves, means for applying said sensitising pulses to said oscillator to lower said bias and condition the oscillator for the initiation of oscillation by each of the desired signal pulses, and means comparing the timing of the signal pulse initiated oscillations and the sensitising pulses for synchronising the frequency of said oscillator circuit waves.

2. A receiving arrangement for selecting a desired train of electric signal pulses from other pulses and noise, comprising a high frequency oscillator, means for biassing the said oscillator in such manner that it is normally incapable of oscillation, an oscillator circuit for producing waves of the same frequency as the repetition frequency of the desired pulses, means for deriving a train of synchronising pulses from said waves, means for applying the synchronised pulses to the oscillator to lower said bias so that each pulse conditions the oscillator for the initiation of oscillations by a signal applied coincidentally thereto, means responsive to the degree of coincidence of said initiated oscillations and said synchronising pulses for producing a proportionate control signal, means for applying the control signal to the oscillator circuit to control the frequency thereof.

3. An arrangement according to claim 1 wherein said means for deriving synchronising pulses comprises amplitude limiting means for deriving rectangular pulses from the said waves, means for deriving the sensitising pulses from the said rectangular pulses, and means for shaping said sensitising pulses to have very steep leading edges, and trailing edges which gradually decay.

4. An arrangement according to claim 3 in which the said trailing edges decay logarithmically.

5. An arrangement according to claim 4 in which the shaping means comprises an amplifying valve arranged as a cathode follower and normally in a cut off condition, said shaping means comprising means for differentiating said rectangular pulses, means for applying said differentiated pulses to said valve, an integrating circuit connected in series with the cathode of the valve for integrating said differentiated pulses to derive sensitising pulses having said steep leading edges and trailing edges which gradually decay.

6. An arrangement according to claim 5 wherein said oscillator comprises a valve having an anode circuit, means for applying the voltage variations of the cathode of the said amplifying valve to the anode circuit of said oscillating valve.

7. An arrangement according to claim 2 in which the oscillator circuit is of the transitron type.

8. An arrangement according to claim 7 in which the frequency of the said oscillator circuit is determined by a resonant circuit including an inductance having an iron core.

9. An arrangement according to claim 2 wherein said means for comparing comprises a gating valve, means for applying output pulses from the said gating valve to control the frequency of the waves of said oscillator circuit, and means for applying the said initiated oscillations and also the said sensitising pulses to the said gating valve, said gating valve responsive to the degree of coincidence of the oscillations and pulses applied thereto to produce said control voltage.

CHARLES WILLIAM EARP.

REFERENCES CITED

The following references are of record in the file of this patent:

UNITED STATES PATENTS

| Number | Name | Date |
|---|---|---|
| 1,453,599 | Bown | Oct. 13, 1922 |
| 2,416,308 | Grieg | Feb. 25, 1947 |
| 2,419,569 | Labin | Apr. 29, 1947 |
| 2,419,570 | Labin | Apr. 29, 1947 |
| 2,425,667 | Berry | Aug. 12, 1947 |

FOREIGN PATENTS

| Number | Country | Date |
|---|---|---|
| 461,749 | Great Britain | Feb. 23, 1937 |